(12) United States Patent
Astrom et al.

(10) Patent No.: US 11,061,121 B2
(45) Date of Patent: Jul. 13, 2021

(54) 3D-CAMERA DEVICE INCLUDING A DIRT DETECTION UNIT

(71) Applicant: VEONEER SWEDEN AB, Vargarda (SE)

(72) Inventors: Rickard Astrom, Stockholm (SE); Evelina Eriksson, Skelleftea (SE); Jonas Wihlbeck, Ursviken (SE); Hallstig Emil, Lulea (SE)

(73) Assignee: VEONEER SWEDEN AB, Vargarda (SE)

( * ) Notice: Subject to any disclaimer, the term of this patent is extended or adjusted under 35 U.S.C. 154(b) by 0 days.

(21) Appl. No.: 16/489,137

(22) PCT Filed: Feb. 22, 2018

(86) PCT No.: PCT/EP2018/054413
§ 371 (c)(1),
(2) Date: Aug. 27, 2019

(87) PCT Pub. No.: WO2018/154000
PCT Pub. Date: Aug. 30, 2018

(65) Prior Publication Data
US 2019/0377072 A1    Dec. 12, 2019

(30) Foreign Application Priority Data

Feb. 27, 2017    (EP) .................................... 17158100

(51) Int. Cl.
*G01S 7/497*    (2006.01)
*H04N 13/254*    (2018.01)
(Continued)

(52) U.S. Cl.
CPC ............ *G01S 7/497* (2013.01); *G08B 21/182* (2013.01); *H04N 13/254* (2018.05);
(Continued)

(58) Field of Classification Search
None
See application file for complete search history.

(56) References Cited

U.S. PATENT DOCUMENTS 7,208,723 B2    4/2007    Takenaga et al.
7,247,838 B2    7/2007    Takenaga et al.
(Continued)

FOREIGN PATENT DOCUMENTS

DE    101 17 397 A1    10/2002
EP    1 457 763 A2    9/2004
(Continued)

OTHER PUBLICATIONS

Kolb et al., "Time-of-Flight Cameras in Computer Graphics," Computer Graphics Forum, vol. 29, No. 1, 2010, 141-159. (Year: 2010).*

(Continued)

*Primary Examiner* — Christopher Braniff
(74) *Attorney, Agent, or Firm* — Dickinson Wright PLLC (57) ABSTRACT

A 3D-camera device (1) comprising a Time-Of-Flight sensor (5) and a light guide (4) with a light transparent cover (3). A light source (6) is arranged to emit light (7) into the transparent cover (3), whereby at least a portion (10) of the emitted light (7) is reflected out through a second portion (3.1) of the transparent cover (3) by dirt (100) present on the outer surface (3.20) of the transparent cover (3). The Time-Of-Flight sensor (5) is arranged to receive light (10) reflected by dirt (100) on the outer surface (3.20) of the transparent cover (3) and to output a signal (L) relative the amount of received reflected light (10). A control unit (20) configured to determine the presence of dirt (100) on the outer surface (3.20) of the transparent cover (3) from the magnitude of the signal (L) from the Time-Of-Flight sensor (5).

14 Claims, 4 Drawing Sheets

(51) Int. Cl.
H04N 13/296 (2018.01)
H04N 17/00 (2006.01)
G08B 21/18 (2006.01)

(52) U.S. Cl.
CPC ......... *H04N 13/296* (2018.05); *H04N 17/002* (2013.01); *G01S 2007/4975* (2013.01)

(56) References Cited

U.S. PATENT DOCUMENTS

| | | |
|---|---|---|
| 9,245,333 B1 | 1/2016 | Beck et al. |
| 9,445,057 B2 | 9/2016 | May et al. |
| 9,804,386 B2 | 10/2017 | Hayakawa et al. |
| 10,089,540 B2 | 10/2018 | May et al. |
| 2005/0030529 A1 | 2/2005 | Schuler et al. |
| 2006/0243894 A1 | 11/2006 | Takenaga et al. |
| 2010/0007870 A1* | 1/2010 | Haberer .................. G01S 7/497 356/5.01 |
| 2014/0232869 A1 | 8/2014 | May et al. |
| 2015/0177512 A1 | 6/2015 | Hayakawa et al. |

FOREIGN PATENT DOCUMENTS

| | | |
|---|---|---|
| EP | 1457763 A2 * | 9/2004 |
| JP | 2008-068701 A | 3/2008 |

OTHER PUBLICATIONS

International Search Report and Written Opinion of PCT/EP2018/054413 dated Mar. 22, 2018.

* cited by examiner

3D-CAMERA DEVICE INCLUDING A DIRT DETECTION UNIT

CROSS-REFERENCE TO RELATED APPLICATIONS

This application is a 35 U.S.C. § 371 national phase of PCT International Application No. PCT/EP2018/054413, filed Feb. 22, 2018, which claims the benefit of priority under 35 U.S.C. § 119 to European Patent Application No. 17158100.2, filed Feb. 27, 2017, the contents of which are incorporated herein by reference in their entirety.

TECHNICAL FIELD

The present disclosure relates to a 3D-camera device with a Time-of-Flight sensor and a light guide, such as a camera lens, having a first end for receiving incident light with a light transparent cover and a dirt detection unit for detecting dirt on the outer surface of the transparent cover.

BACKGROUND

Camera devices, such as 2D- or 3D-digital camera devices, may be employed to control or monitor processes in dirty environments such as industrial manufacturing processes, or in milking robots in the agriculture for instance.

To withstand operation in dirty environments, the camera device is typically enclosed in a sealed housing such that only the end of the light guide is exposed to the external environments around the camera device. A common problem when using this type of camera devices is that dirt accumulates on the transparent cover on the end of the light guide and impairs the quality of the images taken by the camera device. Over time, the transparent cover may be soiled to a degree at which the camera device fails to control the process, which then is interrupted.

This type of dirt induced interruptions results in unnecessary and costly service calls which could have been avoided by a simple cleaning operation.

Thus, there is a need for a camera device having a simple and reliable dirt detection system.

In the automotive industry attempts have been made to integrate systems for detecting rain or foreign substances on the head lamps of cars.

JP2008068701 shows a headlamp module which includes a detection system for determining whether dirt or rain drops adhere to the glass cover of the headlamp. The detection system utilizes the diodes of the headlamp and includes a camera device which registers light that is reflected from objects on the glass cover when the light diodes of the headlamp are lit. Based on the brightness and the shape of the registered light it may be determined whether rain or dirt adheres to the headlamp cover. However, the detection system of JP2008068701 is complicated since it involves a distinguishing determination of both dirt and rain. Its design also involves several particular features which are part of the headlamp of the car. For example, it utilizes the light diodes of the headlamp and is particularly designed with respect to the sloping front cover of the headlamp glass.

US20060243894 shows a system for detecting the presence of rain drops on car windshields. This system is particularly designed for detecting rain, i.e. water drops, and is also designed in view of the inclination of the windshield.

US20150177512 shows a camera device which is provided with a system that uses image analysis for detecting foreign matter on the lens of the camera device. A similar system is described in US20140232869.

Thus, it is an object of the present disclosure to provide a 3D-camera device with a Time-of-Flight sensor which includes a unit for detecting dirt on the outer surface of the transparent cover of the light guide which solves at least one of the aforementioned drawbacks of the prior-art. In particular it is an object of the present disclosure to provide a 3D-camera device with a Time-of-Flight sensor which employs a reliable and simple unit for detecting dirt on the outer surface of the transparent cover of the light guide. Yet a further object of the present disclosure is to provide a 3D-camera device with a Time-of-Flight sensor which includes a unit for detecting dirt on the on the outer surface of the transparent cover of the light guide which may be realized at low cost. Yet a further object of the present disclosure is to provide a 3D-camera device with a Time-of-Flight sensor which includes a unit for detecting dirt on the on the outer surface of the transparent cover of the light guide with high accuracy.

SUMMARY OF THE INVENTION

According to the present disclosure at least one the aforementioned objects are met by a 3D-camera device having a light guide and a Time-of-Flight sensor, wherein the light guide has a first end for receiving incident light and a second end for emitting received light directed towards the Time-of-Flight sensor wherein the first end includes a light transparent cover having a first portion having an outer surface facing the external surroundings of the camera device characterized in, a dirt detection unit for detecting dirt on the outer surface of the transparent cover includes:

- a light source arranged to emit light into the transparent cover, wherein the emitted light is directed in a predetermined angle (A) such that at least a portion of the emitted light is reflected out through a second portion of the transparent cover by dirt present on the outer surface of the transparent cover, and wherein;
- the Time-of-Flight sensor is arranged to receive light reflected by dirt on the outer surface of the transparent cover and to output a signal (L) having a magnitude relative the amount of received reflected light, and;
- a control unit connected to the Time-of-Flight sensor and configured to determine the presence of dirt on the outer surface of the transparent cover from the magnitude of the signal (L) from the Time-of-Flight sensor.

A notable advantage is provided by integrating the dirt detection unit in a 3D-camera device with a Time-Of-Flight sensor and utilizing the Time-of-Flight sensor for light detection. Namely, the very short exposure time of the Time-of-Flight sensor makes it possible to exclude, with high accuracy, exposures of light reflected from background objects from light that originates from dirt on the transparent cover of the 3D-camera device. This in turn results in that essentially all error sources emanating from reflected light pulses from object in the surroundings of the camera device may eliminated and that a true value for the amount of dirt on the transparent cover may be obtained.

According to one alternative of the 3D-camera device the control unit is configured to switch the light source between an off-state in which no light is emitted from the light source and an on-state in which light is emitted from the light source such that light is emitted as a light pulse from the light source, and to control the Time-of-Flight sensor to perform an exposure and to synchronize the exposure of the Time-of-Flight sensor with the light pulse such that the end of the exposure overlaps the beginning of the light pulse. The advantage thereof is that the Time-of-Flight sensor to a very high extent only is exposed to light reflected from dirt on the transparent cover.

Preferably, the control unit is configured to switch the light source repeatedly between an on-state and an off-state such that a series of light pulses are emitted from the light source and to control the Time-of-Flight sensor to perform a first series of exposures which are synchronized with the series of light pulses from the light source such the end of each exposure overlaps the beginning of a light pulse, and to control the Time-of-Flight sensor to perform a second series of exposures which are synchronized with the series of light pulses from the light source such the each exposure is performed prior to the beginning of a light pulse and to determine the presence of dirt on the outer cover of the transparent cover from the difference between the magnitude of the signal (L) from the first series exposures and from the second series exposures. The advantage thereof is that an essentially completely true reading of the presence of dirt on the transparent cover of the 3D-camera device is achieved. This is so, because the second series of exposures essentially cancels the small portion of light reflected from the background in the first series of exposures.

The integration of a dirt detection unit directly within the 3D-camera device results in a substantial increase in the operational reliability of the camera device. It also increases the operational reliability of the process that the camera device is set to control. A further advantage of the camera device is that it is compact. Moreover, since the dirt detection unit utilizes several components already present in the 3D camera device it may be produced at relatively low cost.

In an embodiment of the invention, the camera device includes a housing having a wall portion, wherein the transparent cover is arranged in the wall portion, thereby forming a window in the housing. Thereby, a compact and robust 3D-camera device is achieved in which all components of the 3D-camera device are protected within the housing.

In an embodiment of the invention, the second portion of the transparent cover forms an inner surface and/or a circumferential edge surface of the transparent cover. The light source is thereby arranged to emit light into one of the inner surface and the circumferential edge surface of the transparent cover in direction of the outer surface of the transparent cover. The predetermined angle A is selected such that at least a portion of the emitted light is reflected back through the transparent cover and out through the inner surface by dirt present on the outer surface of the transparent cover. Thus, reflected light is directed into the interior of the housing where it may be detected by the Time-of-Flight sensor of the camera device.

Further alternatives and advantages of the present disclosure are disclosed in the appended claims and the following detailed description.

DEFINITIONS

By "dirt" is meant an unwanted physical substance that block light from entering through the transparent cover of the camera device. By "dirt" is further meant a substance that substantially consists of solid matter. By "dirt" is thereby meant a substance which is particulate rather than viscous. Non-limiting examples of "dirt" may include dust, soil, and manure. Thus, rain or water splash from e.g. highways is not "dirt" in the sense of the present disclosure.

DETAILED DESCRIPTION OF THE EMBODIMENTS

The 3D-camera device according to the present disclosure will now be described more fully hereinafter. The camera device according to the present disclosure may however be embodied in many different forms and should not be construed as limited to the embodiments set forth herein. Rather, these embodiments are provided by way of example so that this disclosure will be thorough and complete, and will fully convey the scope of the present disclosure to those persons skilled in the art. Same reference numbers refer to same elements throughout the description.

Figure 1:
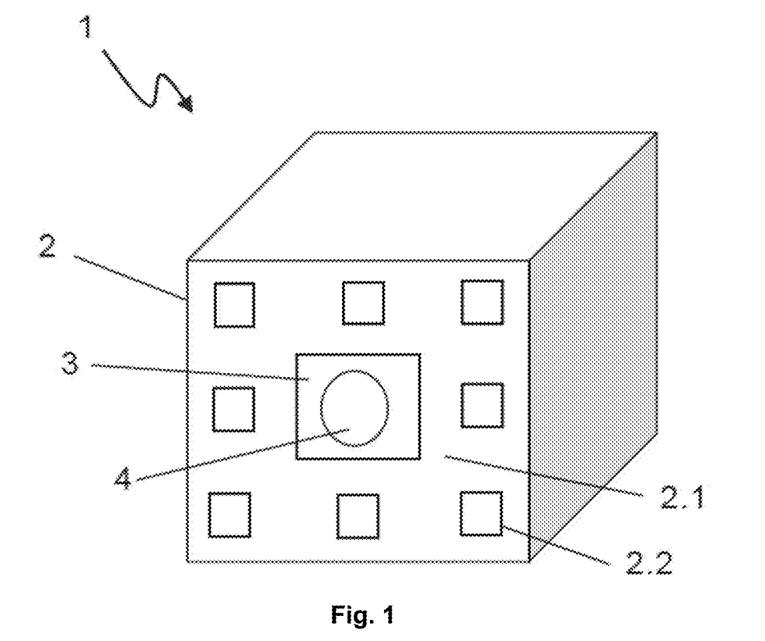
FIG. 1: A schematic drawing of a 3D-camera device according to a first preferred embodiment of the disclosure.

FIG. 1 shows a schematic drawing of a 3D-camera device 1 according to a first embodiment of the present disclosure.

The 3D-camera device 1 includes a housing 2 which encloses the components of the 3D-camera device. Typically, the housing 2 is designed such that it forms a wall around a sealed internal space in which the components of the 3D-camera device are arranged. A light transparent cover 3 of a light guide 4 (which will be described hereinafter) is arranged in a wall portion 2.1 of the housing. The light transparent cover 3 thereby forms a window in the housing 2 such that light from the external surroundings of the 3D-camera device may be transmitted through the transparent cover 3 into the housing 2. The housing 2 may further include auxiliary light sources 2.2 which are arranged around the transparent cover 3 on the external surface of housing 2 in order to illuminate the surroundings in front of the 3D-camera device.

Figure 2:
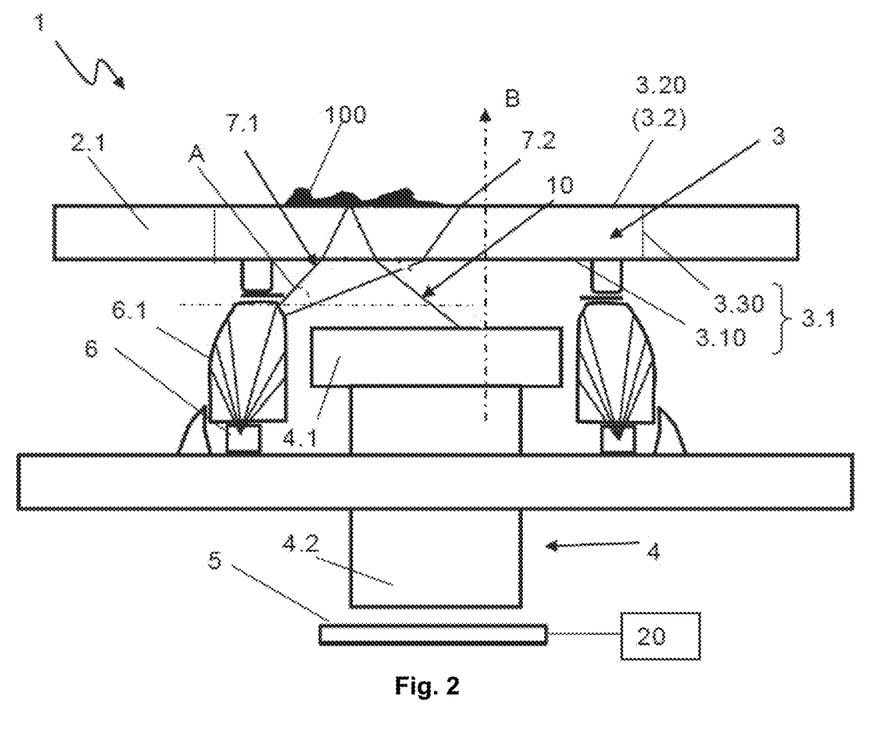
FIG. 2: A schematic cross-sectional drawing of the 3D-camera device according to the first preferred embodiment of the disclosure.

FIG. 2 shows the 3D-camera device 1 according to the first preferred embodiment in cross-section. In FIG. 2, only a wall portion 2.1 of the housing 2 is shown in order to not obscure other features.

The 3D-camera device includes a light guide 4, which may be a camera lens, and that has a first end 4.1 and second end 4.2. The first end 4.2 includes the light transparent cover 3 and is arranged to receive incident light from the external surroundings of the 3D-camera device. The transparent cover 3 is arranged in a corresponding opening in the wall section 2.1 and has an inner surface 3.10, an outer surface 3.20 and a circumferential edge surface 3.30. Thus, the outer surface 3.20 forms a first portion 3.2 of the transparent cover 3 and the inner surface 3.10 and the circumferential edge surface 3.30 forms a second portion 3.1 of the transparent cover 3. The outer surface 3.20 is facing the external surroundings of the 3D-camera device and the inner surface 3.10 is facing the internal space of the housing 2. In the embodiment shown in FIG. 2, the light guide 4 includes (or consists) of a camera lens and the transparent cover 3. A camera lens, or photographic lens, is known in the art and may include one optical lens or an assembly of optical lenses and, optionally, other components such as further lenses and mirrors and optical fiber. The transparent cover 3 may be a piece of transparent rigid or semi rigid material such as glass or plastic, for example poly-carbonate. In the embodiment shown in FIG. 2, the transparent cover 3 is a plane piece of transparent material, such as a sheet, and is separate from the camera lens. However, as will be demonstrated in other embodiments the transparent cover may also be the outermost lens of a camera lens.

It is also possible that the light guide 4 includes a light guide such as an optical tube or an optical fiber and a transparent cover. It is also possible that the light guide 4 is an arrangement of a lens and a light guide and a transparent cover.

The transparent cover 3 and the light guide 4 may have any shape. However, as shown in FIG. 1, the transparent cover 3 is rectangular and the light guide 4 is circular.

The 3D-camera device 1 further includes a Time-of-Flight (ToF) sensor 5, also denominated Time-of-Flight image sensor 5. Typically, the Time-of-Flight sensor includes a sensor pixel plane which detects photons of incident light and generates an electric signal of a magnitude relative the amount of light received by the pixel. The electric signals from the pixels may be converted into a snapshot image.

The light guide 4 and the Time-of-Flight sensor 5 are arranged such that the first end 4.1 of the light guide 4, which includes the transparent cover 3, is directed towards the external surroundings of the 3D-camera device and the second end 4.2 is directed towards the Time-of-Flight sensor 5. The light guide 4 and the Time-of-Flight sensor 5 are thereby arranged such that light which enter the first end 4.1 of the light guide 4 is transmitted to, and detected by, the Time-of-Flight sensor 5.

The 3D-camera device 1 in the above described embodiment may for example be a Fotonic E-series 3D-camera which includes a Time-of-Flight image sensor and which is commercially available from the company Fotonic AB.

According to the present disclosure, the 3D-camera device 1 includes a dirt detection unit for detecting the presence of dirt 100 on the outer surface 3.20 of the transparent cover 3.

The dirt detection unit includes at least one light source 6 which is arranged to emit light 7 into the transparent cover 3. In the embodiment shown in FIG. 2, two light sources 6 are provided on diametrically opposite sides of the center of the light guide 4, however any suitable number of light sources may be provided such as 1, 2, 3 or 4 or more. The light sources 6 may thereby be arranged around the light guide 4. The light source 6 may be a diode, such as a Light Emitting Diode (LED). Preferably, the light source 6 may be an infra-red light source, for example a near infra-red 850 nm light emitting diode commercially available from the company Osram. A near infra-red light emitting diode is advantageous since its light is not visible to the human eye but may be detected by available silicon detectors. The light source 6 may be physically directed, e.g. inclined, to emit light into the second portion 3.1 of the transparent cover 3, i.e. either into the inner surface 3.10 or the circumferential edge surface 3.30. In the embodiment shown in FIG. 2, the light source is arranged to emit light into the inner surface 3.10 of the transparent cover 3. The light 7 emitted by the light source 6 is thereby directed with a predetermined angle A towards the first portion 3.1 of the transparent cover 3. Alternatively, as shown in FIG. 2, the light source 6 may be provided in the form of a light guide 6.1, such as a prism, or an optical fiber, which is arranged to direct the light 7 emitted by the light source 6 in a predetermined angle A towards the inner surface 3.10 of the transparent cover 3.

The predetermined angle A is selected such that at least portion of the light 7 emitted by the light source 6 passes through the transparent cover 3 when the outer surface 3.20 of the transparent cover 3 is clean, i.e. free of dirt 100. This is illustrated by light ray 7.2 in FIG. 2. The predetermined angle A is further selected such that at least a portion 10 of the light 7 emitted by the light source 6 is reflected back through the transparent cover 3 by dirt 100 present on the outer surface 3.20 of the transparent cover 3. This is illustrated by light ray 7.1 in FIG. 2. The predetermined angle A is thereby selected such that the reflected light is reflected out through the second portion 3.1 of the transparent cover 3. In the embodiment shown in FIG. 2, the emitted light 7.1 is reflected by the dirt out through the inner surface 3.10 of the transparent cover 3 and into the light guide 4.

According to the present disclosure, the Time-of-Flight sensor 5 is arranged to receive the light 10 that is reflected from dirt 100 present on the outer surface 3.20 of the transparent cover 3.

Therefore, the predetermined angle A is selected such that the light 10 reflected from dirt 100 on the outer surface 3.20 of the transparent cover 3 and received in the first end 4.1 of the light guide 4 and guided through to the second end 4.2 of the light guide 4 and further to the Time-of-Flight sensor 5 where the reflected light is received.

Further according to the present disclosure, the Time-of-Flight sensor 5 is arranged to output a signal having a magnitude relative to the amount of light received by the light sensor. This signal is in the following denominated "light magnitude signal L".

The Time-of-Flight sensor is based on pixel technology. In this case each pixel of the Time-of-Flight sensor 5 collects the number of photons during the exposure of reflected light 10 and transforms that to a signal which is relative to the amount of light collected by the pixel. Thus, the light magnitude signal L which is outputted from the Time-of-Flight sensor 5 may consist of a plurality of light magnitude signals L from the respective individual pixels.

The dirt detection unit further includes a control unit 20. According to one alterative, the control unit 20 of the dirt detection device may be the control unit which typically is already included in a commercial 3D-digital camera device. However, the control unit 20 may also be an additional control unit.

It is appreciated that at least the light guide 4, the light sources 6 and the Time-of-Flight sensor 5 are arranged within the housing 2. The control unit 20 may be arranged in within the housing 2 or remote from the housing 2. In that case, the control unit may be connected to the light sources 6 and the Time-of-Flight sensor 5 and/or, optionally, to a separate light sensor 9. Connection may be realized by physical wires or by wireless communication techniques such as blue-tooth.

Figures 6, 7:
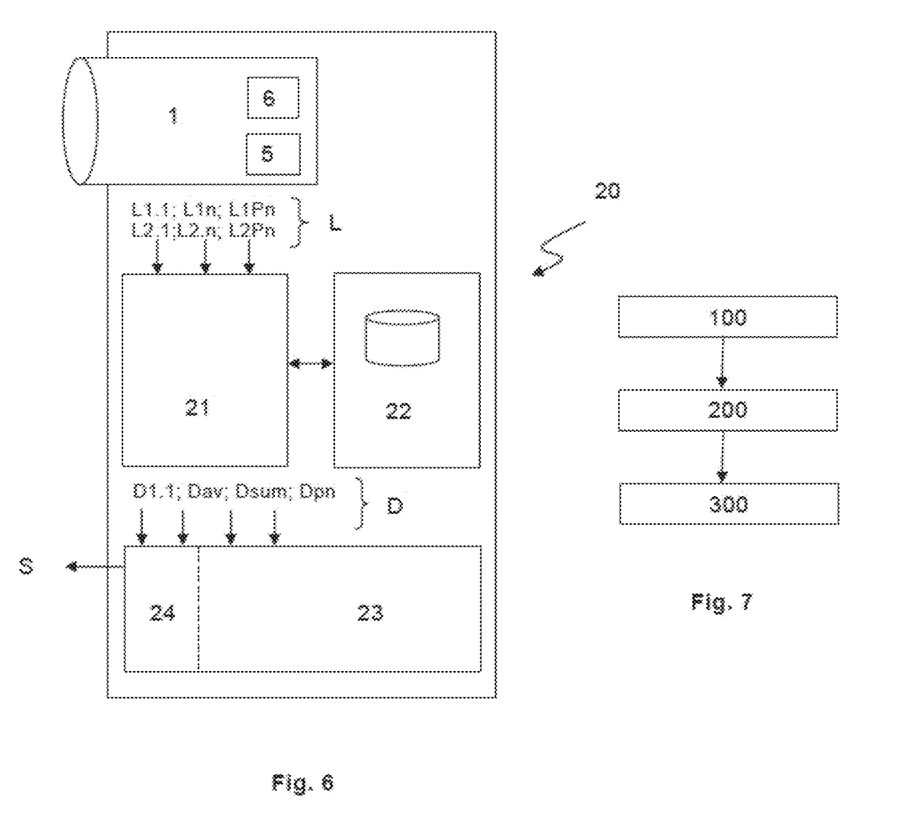
FIG. 6: A schematic drawing of the dirt detection unit according to the present disclosure.
FIG. 7: A schematic diagram of method steps executed in the camera device.

FIG. 6 shows a schematic diagram of the control unit 20 of the 3D-camera device 1. The control unit 20 includes a processing unit 21, such as an electronic processor, which is connected to a memory unit 22 and a dirt alert unit 23.

The processing unit 21 is configured to receive the light magnitude signal L from the Time-of-Flight sensor 5 and to execute a method for determining the presence of dirt on the outer surface 3.20 of the transparent cover 3 of the 3D-camera device. The processing unit 21 is further configured to output a signal D relative the amount of dirt on the transparent cover 2 of the 3D-camera device. This signal is in the following denominated "dirt magnitude signal D". The dirt magnitude signal D may be outputted to the dirt alert unit 23 which has a user interface 24. The dirt alert unit 23 may be configured to output a user alert signal S, such as an audio signal or a visual signal in dependency of the magnitude of the dirt magnitude signal. The memory unit 22, which is a computer readable medium, such as a flash memory, may be configured to carry instructions that when loaded into the processing unit 21 executes a method for detecting the presence and preferably the amount of dirt on the transparent cover of the 3D-camera device. However, these instructions may also be contained in the processor unit 21 itself. The memory unit 22 may further incorporate a database of pre-stored calibration values or threshold values for the dirt magnitude signal D. Loading of the instructions from the memory unit 22 into the processing unit 21 may be performed by a computer data reading device (not shown).

The control unit 20 is further connected to the light source 6 such that the control unit 20 may switch the light source 6 between an on-state in which light is emitted as a light pulse from the light source 6 and an off-state in which no light is emitted from the light source 6.

The control unit 20 may be configured to automatically start dirt detection.

It is appreciated that, in operation of dirt detection unit, the Time-of-Flight sensor 5 is out of the focus with respect to the transparent cover 3.

It is further appreciated that, when the Time-of-Flight sensor 5 is used to detect reflected light during dirt detection, the Time-of-Flight sensor 5 is in exposure mode, i.e. in a mode where the Time-of-Flight sensor 5 is detecting light. The Time-of-Flight sensor 5 may thereby be set in a constant mode of exposure or to do exposures repeatedly.

The method of determining the presence of dirt on the transparent cover of the 3D-camera device includes the steps below. The steps are schematically shown in FIG. 7.

In a first step 100, the light source 6 is set in at least a first off-state and subsequently in at least a first on-state.

During each off-state and on-state the light sensor outputs a light magnitude signal L to the control unit 20 relative the amount of light received by the Time-of-Flight image sensor 5. Thus, a first off-light magnitude signal L1.1 is outputted when the light source 6 is in a first off-state and a first on-light magnitude signal 2.1 is outputted when the light source 6 is in the first on-state.

In a second step 200, the control unit 20 determines the difference between the first off-light magnitude signal L1.1 and the first on-light magnitude signal L2.1 and outputs a first dirt magnitude signal D1.1.

By comparing two light magnitude signals L1.1 and L2.1 with the light source in off-state respectively on-state essentially all image information apart from light 10 reflected from dirt on the inner surface of the transparent cover is cancelled. It may therefore be determined that no dirt is present on the outer surface of the transparent cover when the difference between the first off-light magnitude signal L1.1 and the first on-light magnitude signal L2.1 is zero. Accordingly it may further be determined that dirt is present on the outer surface of the transparent cover when the difference between the first off-light magnitude signal L1.1 and the first on-light magnitude signal L2.1 is greater than zero.

In a third (optional) step 300, the first dirt magnitude signal D1.1 may be outputted to the dirt alert unit 23 which may be configured to compare the first dirt magnitude signal D1.1 with at least one dirt magnitude threshold value and to output an alert signal on the user interface 24 when the first dirt magnitude signal D1.1 is equal to or exceeds the dirt magnitude threshold value.

According to a first alternative of the method above, the control unit 20 may in the first step 200 repeatedly switch the light source 6 between an off-state and an on-state. The Time-of-Flight sensor 5 outputs thereby a plurality of off-light magnitude signals L1.$n$ and a plurality of on-light magnitude signals L2.$n$ The control unit 20 may thereby be configured to calculate an average or integrate off-light magnitude value from the plurality of off-light magnitude signals L1.$n$ and an average or integrate on-light magnitude value from the plurality of on-light magnitude signals L1.$n$. The control unit 20 may further determine an average dirt magnitude value from the difference between the average off-light magnitude values and the average on-light magnitude values. The average dirt magnitude value may be outputted as an average dirt average magnitude signal Day to the dirt alert unit 23. This alternative of the method provides a stable and reliable dirt magnitude value which increases the correctness in the determination of presence of dirt on the inner surface of the transparent cover. By "integrate magnitude" is meant the sum of the on-, respectively off-light magnitudes.

According to a second alternative of the method above, the control unit 20 is configured to receive a plurality of individual light magnitude signals from the pixels of the Time-of-Flight sensor 5. That is a plurality of off-light magnitude signals L1P$n$ and a plurality of on-light magnitude signals L2P$n$ (P$n$ indicates the individual pixel). The control unit 20 may thereby be configured to calculate an off-light magnitude value from the integrate or the average magnitude of all individual off-light magnitude signals L1P$n$. Accordingly, the control unit 20 may be configured to calculate an on-state light magnitude value from the integrate or the average of the magnitude of all individual light magnitude signals L2P$n$. The control unit 20 may further be configured to determine a dirt magnitude value from the difference between the off-state light magnitude value and the on-state light magnitude value. The dirt magnitude value may be outputted from the processing unit 21 as a dirt magnitude sum signal Dsum.

Further according to the second alternative, the control unit 20 may be configured to determine an individual dirt magnitude value for each pixel of the Time-of-Flight sensor 5. The plurality of individual dirt magnitude values may be outputted from the processing unit 21 as a plurality of individual dirt magnitude signals Dp$n$. The dirt alert unit 23 of the control unit 20 may thereby be configured to determine the distribution of dirt on the outer surface of the transparent cover from the individual dirt magnitude signals Dp$n$. The distribution of dirt on the outer surface of the transparent cover may be presented visually on the dirt alert unit 23 in the form of an image.

Returning to FIG. 2. FIG. 2 shows the predetermined angle A by which the light 7 emitted by the light source 6 is directed towards the first portion 3.1 the transparent cover 3. The predetermined angle A is determined from the vertical axis B of the 3D-camera device 1 and an auxiliary orthogonal axis. In FIG. 2, the light 7 is directed with a predetermined angle A into the inner surface 3.10 of the transparent cover 3.

A suitable value for the predetermined angle A depends on various factors of the 3D-camera device 1. These factors may include dimensions of the 3D-camera device 1, position and type of the light source or the material of the transparent cover and therefore the suitable angle A may have to be determined by the skilled person on case to case basis for different configurations of the 3D-camera devices. Determination of a suitable angle A may be based on practical trials, optical calculations, simulations or on the skilled person's experience.

Characteristics of a suitable angle A will be described with reference to FIG. 3 in which the light 7 is emitted into, and reflected out through, the inner surface 3.10 of the transparent cover. It is further appreciated that FIG. 3 and the description below are schematic and intended to illustrate the principle of selection of a suitable angle.

Figure 3:
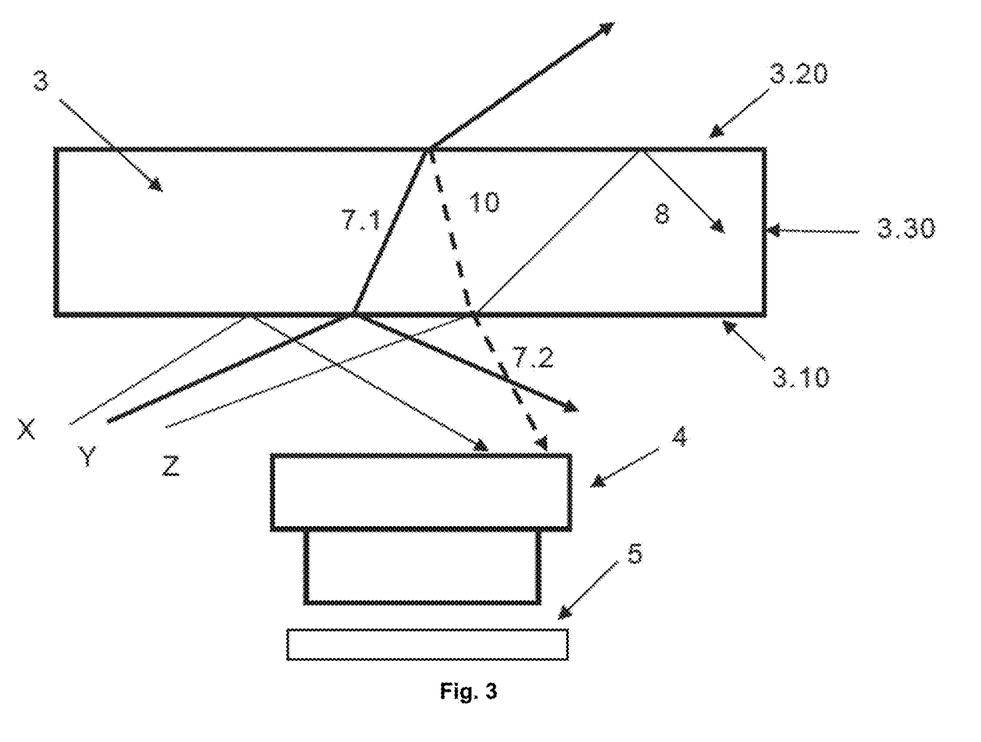
FIG. 3: A schematic cross-sectional drawing showing details of the 3D-camera device according to the first preferred embodiment of the disclosure.

FIG. 3 which shows three light rays X, Y and Z which are emitted from a light source (not shown) towards the inner surface 3.10 of the transparent cover 3 of the 3D-camera device 1.

The angle of light ray X is not suitable since at least a part of the light ray is reflected from the inner surface 3.10 of the transparent cover 3 into the light guide 4. Light ray X may therefore cause a too high dirt reading.

The angle of light ray Z is not suitable due to total internal reflection of the light ray in the transparent cover 3. Light ray Z may therefore result in no or too low dirt readings. It may be noted that rain sensors in windshields for automobiles utilizes light rays which result in total reflections in the windshield.

The angle of light ray Y is suitable for detecting dirt on the outer surface 3.20 of the transparent cover 33. The angle Y is selected such that total reflection is avoided and that at least a portion 7.1 of the light ray passes through the transparent cover 3 when the outer surface 3.20 of the transparent cover 3 is clean. The angle Y is further selected such that at least a portion 10 of the light ray is reflected back into the light guide 4 when dirt (not shown) is present on the outer surface 3.20 of the transparent cover 33. The light ray Y is further selected such that the portion 7.2 which may be directly reflected on the inner surface 3.10 of the transparent cover 3 is directed away from the light guide 4.

It is appreciated that there may be a range of angles A that are suitable for dirt detection on a specific 3D-camera device.

Figure 4:
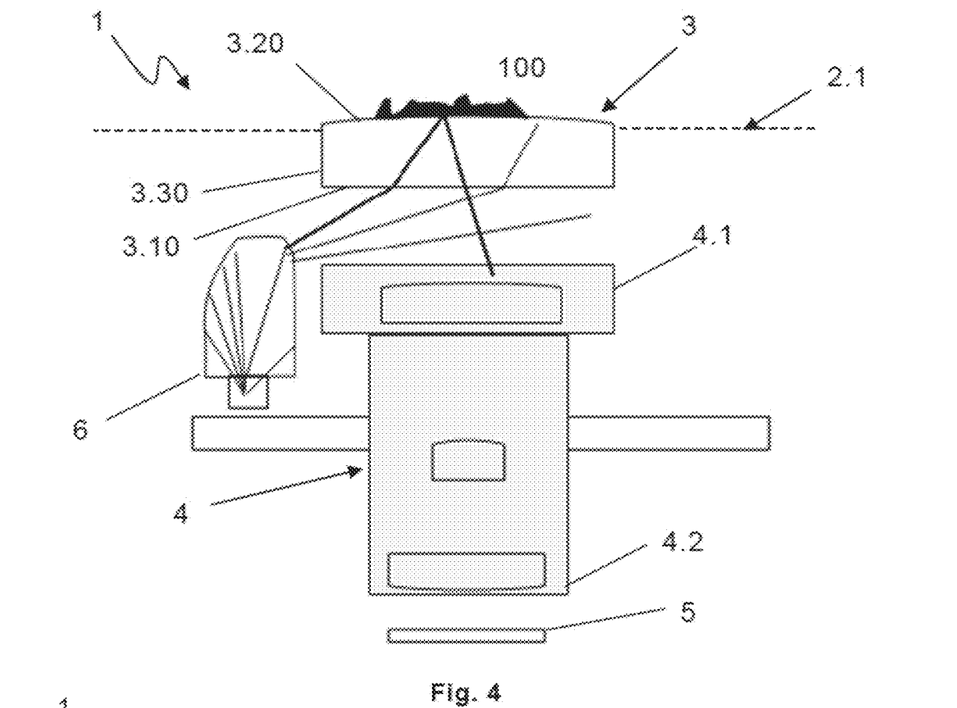
FIG. 4: A schematic cross-sectional drawing of the 3D-camera device according to a second preferred embodiment of the disclosure.

FIG. 4 shows a second embodiment of the 3D-camera device 1 of the present disclosure. According to this embodiment, the transparent cover 3 of the light guide 4 is an optical lens. Preferably, light guide 4 is a camera lens whereby the transparent cover 3 is the outermost optical lens of the camera lens 4. In this embodiment, the transparent cover 3, being an outermost optical lens of the camera lens 4, is arranged in a wall portion 2.1 of the housing 2 of the 3D-camera device 1. Other parts of the 3D-camera device 1 of the second embodiment are identical to the 3D-camera device of the first embodiment. The camera lens 4 may include a housing (not shown) which encloses the assembly of lenses of the camera lens. The light sources 6 may thereby be arranged to emit light into appropriate openings in the housing of the camera lens. Alternatively, the light sources 6 may be arranged within the housing of the camera lens (not shown).

Figure 5:
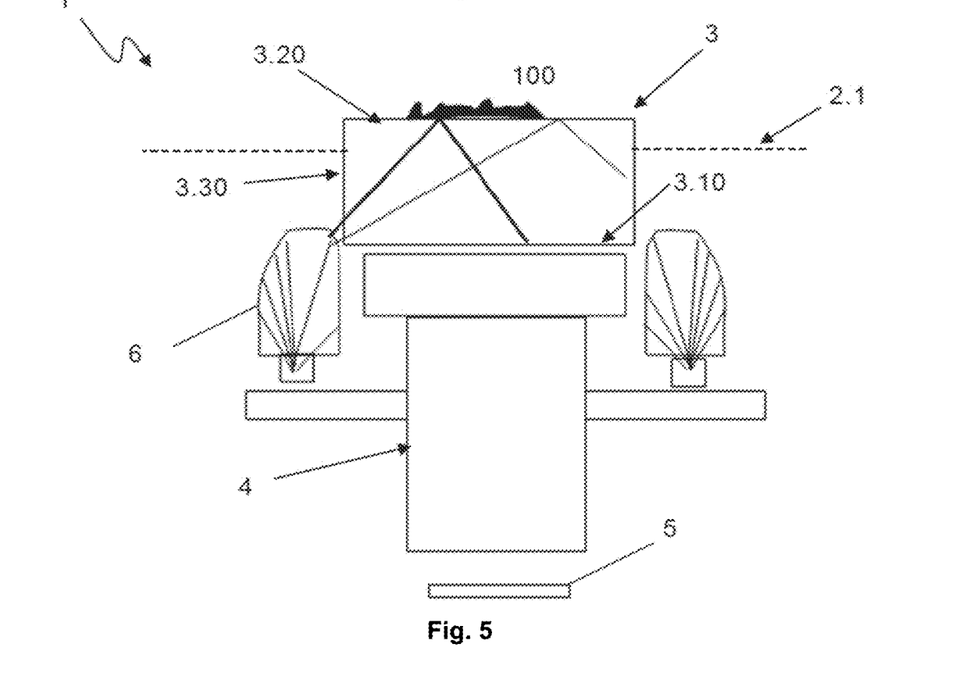
FIG. 5: A schematic cross-sectional drawing of the 3D-camera device according to a third preferred embodiment of the disclosure.

FIG. 5, shows a third embodiment of the 3D-camera device 1 according to the present disclosure. In this embodiment, the light sources 6 are arranged to emit light into the circumferential edge surface 3.30 of the transparent cover. In this case the transparent cover 3 is dimensioned such that at least a portion of the circumferential edge surface 3.20 extends into the internal space that is delimited by the housing 2. Other parts of the 3D-camera device 1 of the third embodiment are identical to the 3D-camera device of the first embodiment.

Figure 8:
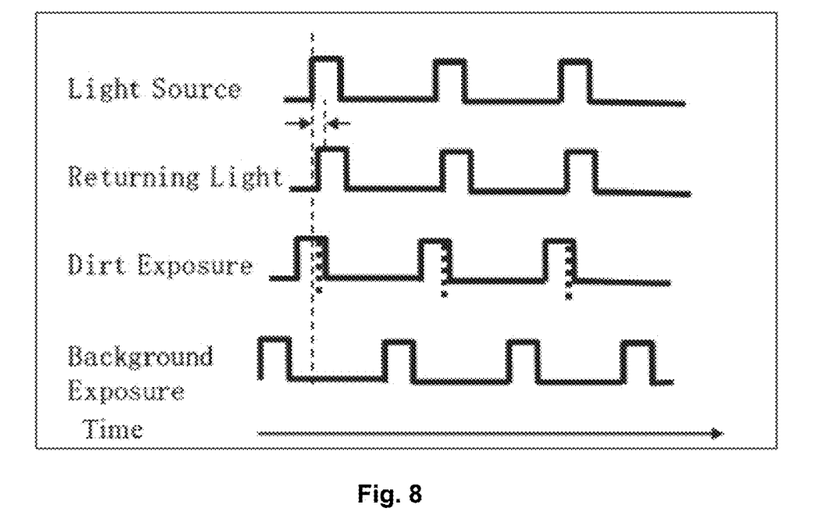
FIG. 8: An explanatory diagram of the exposure time of the Time-of-Flight-sensor.

FIG. 8 is a diagram showing the function of a 3D-camera device according to the present disclosure in the form of a 3D-camera device with a Time-of Flight sensor.

A 3D-camera device with a Time-of-Flight sensor operates at very high speed, which allows the 3D-camera device to make a series of very short exposures. The exposure time, i.e. the time from the beginning to the end of an exposure may be in the range of 0.2-100 milliseconds. For example 0.2-50 milliseconds or 0.2-30 milliseconds or 0.2-20 milliseconds or 0.2-10 milliseconds. The first row 1 of FIG. 9 shows a series of periodic light pulses from the light source 6 of the 3D-camera device. That is the light source is repeatedly switched between an off-state and an on-state. The length of the light pulses may be equal to longer than the exposures. The second row 2 shows the returning light that is reflected back from any dirt on the transparent cover and from objects in the external surroundings of the 3D-camera device. It is appreciated that the beginning of the retuning light pulse is constituted of light that is reflected from dirt on the transparent cover of the 3D-camera device since this light travels the shortest distance. The end of the return light pulse is constituted of light reflected from objects in the external surroundings of 3D-camera device.

The third row 3 shows a first series of exposures of the Time-of-flight sensor. Since the exposures are very short, it is possible to synchronize the exposures with the light pulses from the light sources so that the end of an exposure overlaps the beginning of the light pulse. Therefore, the Time-of-Flight sensor only detects background light (at the beginning of the exposure) and light that is reflected back from dirt on the transparent cover (at the end of the exposure). The exposure is ended before the returning light pulse from objects in the external surroundings of the 3D-camera device arrives at the Time-of-Flight sensor. For example, the exposure time of the first series of exposures may be set such that the second half of each exposure approximately overlaps the beginning of the light pulse from the light source.

The fourth row 4 shows a second series of exposures of the Time-of-Flight sensor, i.e. exposures taken when the light source if in off-state. The series of background exposures are off-set from the light pulses from the light sources so that a first background exposure is performed prior to the first light pulse. Thereafter the further background exposures are done with sufficient delay to avoid detection of any reflected light pulses from objects in the external surroundings of the 3D-camera device. This may be achieved by appropriate selection of exposure time and periodicity of the second series exposures and may be determined in view of the present operating conditions.

While the above description constitutes the preferred embodiment of the present invention, it will be appreciated that the invention is susceptible to modification, variation and change without departing from the proper scope and fair meaning of the accompanying claims.

The invention claimed is:

1. A 3D-camera device comprising,
a light guide,
a Time-of Flight sensor having a sensor pixel plane for creating an image, wherein the light guide has a first end for receiving incident light and a second end for emitting received light directed towards the Time-of Flight sensor, wherein the first end comprises a light transparent cover having an outer surface facing the external surroundings of the 3D-camera device, a dirt detection unit for detecting a dirt on the outer surface of the transparent cover:

the dirt detection unit including a light source arranged to provide emitted light into the transparent cover, wherein the emitted light is directed in a predetermined angle such that at least a first portion of the emitted light is reflected out through a portion of the transparent cover by the dirt present on the outer surface of the transparent cover, and a second portion of the emitted light from the light source is transmitted through the transparent cover into an environment for the detection of objects in the environment and light reflected by the objects passes through the transparent cover and is received by the Time-of-Flight sensor, and, wherein;

the Time-of-Flight sensor is arranged to receive the first portion of emitted light reflected by the dirt present on the outer surface of the transparent cover and to output a signal having a magnitude relative the amount of the received portion of emitted reflected light, and;

a control unit connected to the Time-of-Flight sensor configured to determine the presence of the dirt on the outer surface of the transparent cover from the magnitude of the signal from the Time-of-Flight sensor.

2. The 3D-camera device according to claim 1 further comprising wherein the control unit is configured to:

switch the light source between an off-state in which no light is emitted from the light source and an on-state in which light is emitted from the light source such that light is emitted as a light pulse from the light source, and to control the Time-of-Flight sensor to perform an exposure and to;

synchronize the exposure of the Time-of-Flight sensor with the light pulse such that an end of the exposure overlaps a beginning of the light pulse.

3. The 3D-camera device according to claim 2 further comprising wherein, when the light source is in the off-state, the Time-of-Flight sensor outputs at least a first off-light magnitude signal and, when the light source is in the on-state, outputs at least a first on-light magnitude signal, wherein the control unit is configured to;

determine the difference between the first off-light magnitude signal and the first on-light magnitude signal; and output at least a first of the dirt magnitude signal indicative of the magnitude of the difference between the at least first off-light magnitude signal and the at least first on-light magnitude signal.

4. The 3D-camera device according to claim 3 wherein the control unit comprises a dirt alert unit and a memory comprising predetermined threshold values for the dirt magnitude signal, wherein the control unit is arranged to compare the dirt magnitude signal with the predetermined threshold values, and to output an alert signal on a user alert interface when the dirt magnitude signal exceeds a predetermined threshold value.

5. The 3D-camera device according to claim 1 further comprising a housing having a wall portion, wherein the transparent cover is arranged in the wall portion, thereby forming a window in the housing.

6. The 3D-camera device according to claim 1 wherein the light source is arranged to emit the light into the portion of the transparent cover in a direction of the outer surface.

7. The 3D-camera device according to claim 1 wherein the portion of the transparent cover comprises an inner surface or a circumferential edge surface of the transparent cover.

8. The 3D-camera device according to claim 7 further comprising wherein the light source is arranged to emit the light into one of the inner surface and the circumferential edge surface of the transparent cover and wherein the predetermined angle is selected such that at least a portion of the emitted light is reflected out through the inner surface of the transparent cover by the dirt present on the outer surface of the transparent cover.

9. The 3D-camera device according to claim 1 further comprising wherein the light guide is an optical lens or an arrangement of several optical lenses or a camera lens.

10. A 3D-camera device comprising,
a light guide,
a Time-of Flight sensor,
wherein the light guide has a first end for receiving incident light and a second end for emitting received light directed towards the Time-of Flight sensor, wherein the first end comprises a light transparent cover having an outer surface facing the external surroundings of the 3D-camera device, a dirt detection unit for detecting a dirt on the outer surface of the transparent cover:

the dirt detection unit including a light source arranged to provide emitted light into the transparent cover, wherein the emitted light is directed in a predetermined angle such that at least a portion of the emitted light is reflected out through a portion of the transparent cover by the dirt present on the outer surface of the transparent cover, and, wherein;

the Time-of-Flight sensor is arranged to receive the portion of emitted light reflected by the dirt present on the outer surface of the transparent cover and to output a signal having a magnitude relative the amount of the received portion of emitted reflected light, and;

a control unit connected to the Time-of-Flight sensor configured to determine the presence of the dirt on the outer surface of the transparent cover from the magnitude of the signal from the Time-of-Flight sensor the control unit is configured to:

switch the light source repeatedly between an on-state and an off-state such that a series of light pulses are emitted from the light source and to;

control the Time-of-Flight sensor to perform a first series of exposures which are synchronized with the series of light pulses from the light source such that an end of each exposure overlaps a beginning of the light pulse, and to;

control the Time-of-Flight sensor to perform a second series of exposures which are synchronized with the series of light pulses from the light source such that each of the exposures is performed prior to the beginning of a light pulse and to;

determine the presence of the dirt on the outer cover of the transparent cover from the difference between the magnitude of the signal from the first series of exposures and from the second series of exposures thereby providing a dirt magnitude signal.

11. A 3D-camera device comprising,
a light guide,
a Time-of Flight sensor, wherein the light guide has a first end for receiving incident light and a second end for emitting received light directed towards the Time-of Flight sensor, wherein the first end comprises a light transparent cover having an outer surface facing the external surroundings of the 3D-camera device, a dirt detection unit for detecting a dirt on the outer surface of the transparent cover:

the dirt detection unit including a light source arranged to provide emitted light into the transparent cover, wherein the emitted light is directed in a predetermined angle such that at least a portion of the emitted light is reflected out through a portion of the transparent cover by the dirt present on the outer surface of the transparent cover, and, wherein;

the Time-of-Flight sensor is arranged to receive the portion of emitted light reflected by the dirt present on the outer surface of the transparent cover and to output a signal having a magnitude relative the amount of the received portion of emitted reflected light, and;

a control unit connected to the Time-of-Flight sensor configured to determine the presence of the dirt on the outer surface of the transparent cover from the magnitude of the signal from the Time-of-Flight sensor, the control unit is configured to:

switch the light source between an off-state in which no light is emitted from the light source and an on-state in which light is emitted from the light source such that light is emitted as a light pulse from the light source, and to control the Time-of-Flight sensor to perform an exposure and to;

synchronize the exposure of the Time-of-Flight sensor with the light pulse such that an end of the exposure overlaps a beginning of the light pulse, wherein, when the light source is in the off-state, the Time-of-Flight sensor outputs a plurality of individual off-light magnitude signals and, when the light source is in the on-state, outputs a plurality of individual on-light magnitude signals wherein the control unit is configured to, determine a plurality of individual of the dirt magnitude values from the difference between the individual off-light magnitude signals and the individual on-light magnitude signals and;

output the dirt magnitude signal indicative of a difference between the individual off-light magnitude signals and the individual on-light magnitude signals.

12. The 3D-camera device according to claim 11 further comprising wherein the dirt magnitude signal is indicative of the difference between an integration or an average magnitude of the individual off-light magnitude signals and an integration or an average magnitude of the individual on-light magnitude signals.

13. A 3D-camera device comprising,
a light guide,
a Time-of Flight sensor,
wherein the light guide has a first end for receiving incident light and a second end for emitting received light directed towards the Time-of Flight sensor, wherein the first end comprises a light transparent cover having an outer surface facing the external surroundings of the 3D-camera device, a dirt detection unit for detecting a dirt on the outer surface of the transparent cover:

the dirt detection unit including a light source arranged to provide emitted light into the transparent cover, wherein the emitted light is directed in a predetermined angle such that at least a portion of the emitted light is reflected out through a portion of the transparent cover by the dirt present on the outer surface of the transparent cover, and, wherein the predetermined angle is selected such that a first portion of the emitted light is transmitted through an inner surface of the transparent cover and a second portion of the emitted light is directly reflected by the inner surface of the transparent cover, and such that the directly reflected light is directed away from the Time-of-Flight sensor, the Time-of-Flight sensor is arranged to receive the portion of emitted light reflected by the dirt present on the outer surface of the transparent cover and to output a signal having a magnitude relative the amount of the received portion of emitted reflected light, and;

a control unit connected to the Time-of-Flight sensor configured to determine the presence of the dirt on the outer surface of the transparent cover from the magnitude of the signal from the Time-of-Flight sensor.

14. The 3D-camera device according to claim 13 further comprising, a third portion of the emitted light from the light source is transmitted through the transparent cover into an environment for the detection of objects in the environment and light reflected by the objects passes through the transparent cover and is received by the Time-of-Flight sensor.

* * * * *